Jan. 21, 1947.  L. E. CROSBY ET AL  2,414,582
FLUID FLOW MEASURING APPARATUS
Filed Feb. 26, 1944  6 Sheets-Sheet 1

INVENTORS
LAWRENCE E. CROSBY
CHARLES W. TRAUTMAN
BY
ATTORNEY

Jan. 21, 1947.  L. E. CROSBY ET AL  2,414,582
FLUID FLOW MEASURING APPARATUS
Filed Feb. 26, 1944  6 Sheets-Sheet 5
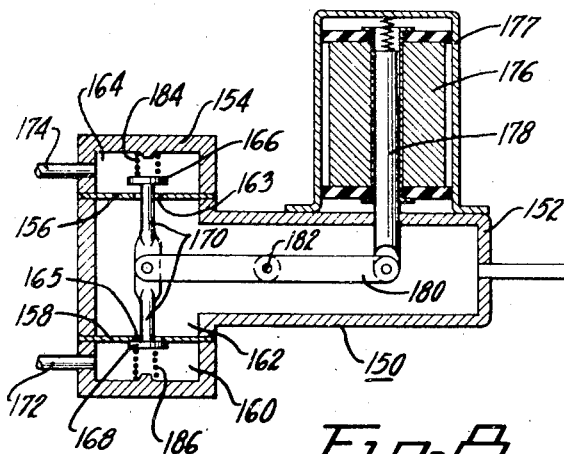
Fig. 8
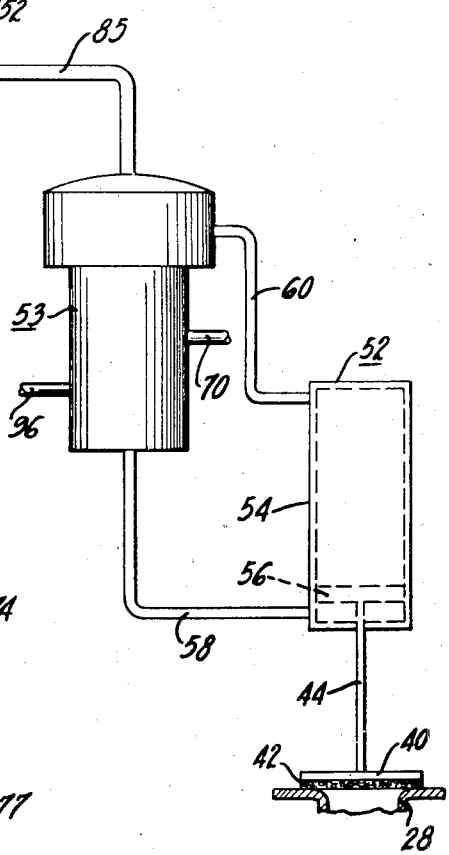
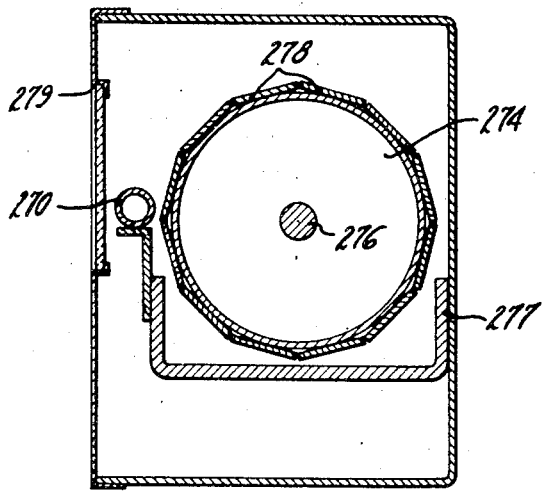
Fig. 10
INVENTORS
LAWRENCE E. CROSBY
CHARLES W. TRAUTMAN
BY
ATTORNEY Patented Jan. 21, 1947

2,414,582

UNITED STATES PATENT OFFICE 2414,582

FLUID FLOW MEASURING APPARATUS

Lawrence E. Crosby and Charles W. Trautman, South Bend, Ind., assignors to Bendix Aviation Corporation, South Bend, Ind., a corporation of Delaware Application February 26, 1944, Serial No. 523,994

17 Claims. (Cl. 73—3)

This invention relates to carburetor flow box systems and particularly to automatic means for correlating various scales of pressure differential or the like with various sized orifice openings or combinations of orifice openings through which fluid in such a flow box system is passed.

It is well known to use flow boxes to make various tests for carburetors. Some of such flow boxes include an air bottle having removable air orifices and an inclined manometer having various scales for use in connection therewith, different scales being used with respective orifices or combinations of orifices. In such devices each scale is calibrated to measure the flow through the pressure drop across an orifice or combination of orifices of certain capacity and said scales are adapted to register such drop up to the full throat opening or capacity of the orifice or combinations of orifices.

Since the amount of fluid, such for example as air, supplied to a charge forming device or carburetor for internal combustion engines or the like varies between wide limits, depending upon the demands of the internal combustion engine, it is desirable to have a device which is adaptable to all conditions of demand, and which will throughout the range of demand furnish an accurate measurement of the air supply. It is obvious that a single size orifice is not readily adaptable to all conditions of fluid flow. That is, an orifice small enough to produce at low flows a differential pressure sufficient in amount to be accurately measured will be too small to accommodate the high rates of air flow and conversely, the use of an orifice sufficiently large to accommodate large air demands will give almost no measurable difference in pressures across the orifice under conditions of low air demand. For this reason it is advantageous to provide a plurality of orifices of different sizes, each particularly adapted to measure the flow through a particular portion of the range. Under some circumstances it is also desirable to provide air through a plurality of orifices. A desirable feature, therefore, in such a multiple orifice flow meter lies in the ability to quickly change the size of orifices desired for particular air demand and to change the pressure differential gauge or scale used therewith with comparative ease and rapidity, each gauge or scale being calibrated for its corresponding orifice to indicate directly the rate of air flow or pressure differential across said orifice. Where a plurality of scales and a plurality of orifices or combinations thereof of various capacities are used it is desirable to have the scales so graduated and arranged that the readings on said scales overlap. For example, one scale is used for say a small orifice which will read up to the full throat opening thereof, and another scale is used for the next larger orifice and provides a reading up to the full throat opening of the latter orifice with a portion of said scale reading on the full throat opening of the smaller orifice. Thus a continuity of readings can be accurately made throughout the range of orifice sizes or capacities.

Heretofore orifice insets of various sizes have been used but such insets have been changed by hand, the appropriate scale on the inclinometer then being independently brought into position for indicating the air flow, the tube of said inclinometer being filled with a suitable liquid as is well known in the art. The scales, it may be noted are mounted on a rotatable support or drum and as the support is rotated the respective scales are moved into a position with respect to the manometer tube whereat the height of the liquid in said tube may be easily measured or read on the respective scale.

With such an arrangement there is always the danger of inadvertently using the wrong scale in connection with the orifice which is being used in a test so that the results of the test will be erroneous. In addition considerable time and labor is involved in changing the orifices by hand as said orifices may be quite large and heavy.

It is therefore an important object of the present invention to provide means for the elimination of such errors in the correlation of the manometer scale with the orifice being used and it is a more particular object of the invention to automatically correlate the scales of the manometer or the like with the orifices or combinations of orifices being used in a test.

Another object of the invention is to provide means for automatically rendering various orifices effective as a scale is changed and it is a further object of the invention to provide control means whereby the respective orifice or group of orifices are automatically rendered operative as each scale is brought into position with respect to the manometer tube.

Still another object of the invention is to provide a plurality of fixed orifices which are controlled by respective valves and wherein one or more orifice air valves may be actuated to open respective orifices as respective scales are moved into position adjacent the manometer tube.

A further object of the invention is to provide a device of this character wherein a plurality of valves may be opened in various combinations to make available a wide range of orifice openings.

The invention further contemplates a combination of electrical and pneumatic control systems for correlating the respective scales and orifices.

The invention still further contemplates that the electrical system be controlled by the scale mechanism and said electrical system in turn controls various air valves of the pneumatic system whereby air under superatmospheric pressure actuates the orifice air valves.

Other objects of the invention will be apparent from a study of the description and accompanying drawings and it is to be understood that the scope of the invention is not limited to the embodiment shown, which is for the purpose of illustration only, nor otherwise than by the terms of the appended claims.

In the drawings which are employed merely for the purpose of illustrating a preferred embodiment of the invention:

Figure 5 is an enlarged view of the air bottle of the flow box taken on line 5—5 of Figure 1;

Figure 6 is an enlarged sectional view of one of the air orifice insets and the control valve therefor taken on line 6—6 of Figure 5;

Figure 8 is an enlarged schematic longitudinal section of a solenoid operated air control valve of the pneumatic control system, the pneumatic control valve and orifice valve operating means being included in this view;

Figure 10 is an enlarged section taken on line 10—10 of Figure 4.

Figure 1:
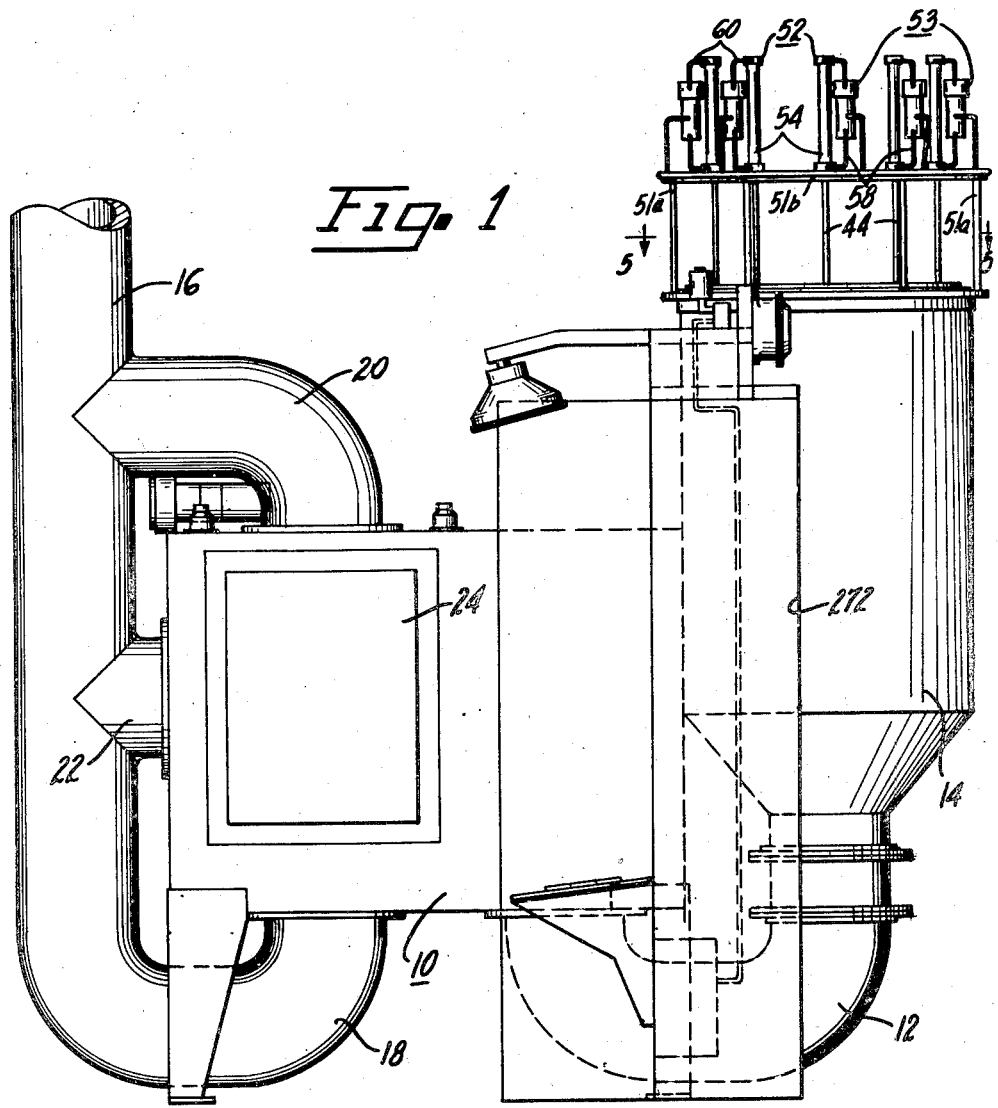
Figure 1 is a side view of a flow box embodying the present invention.
Figure 2:
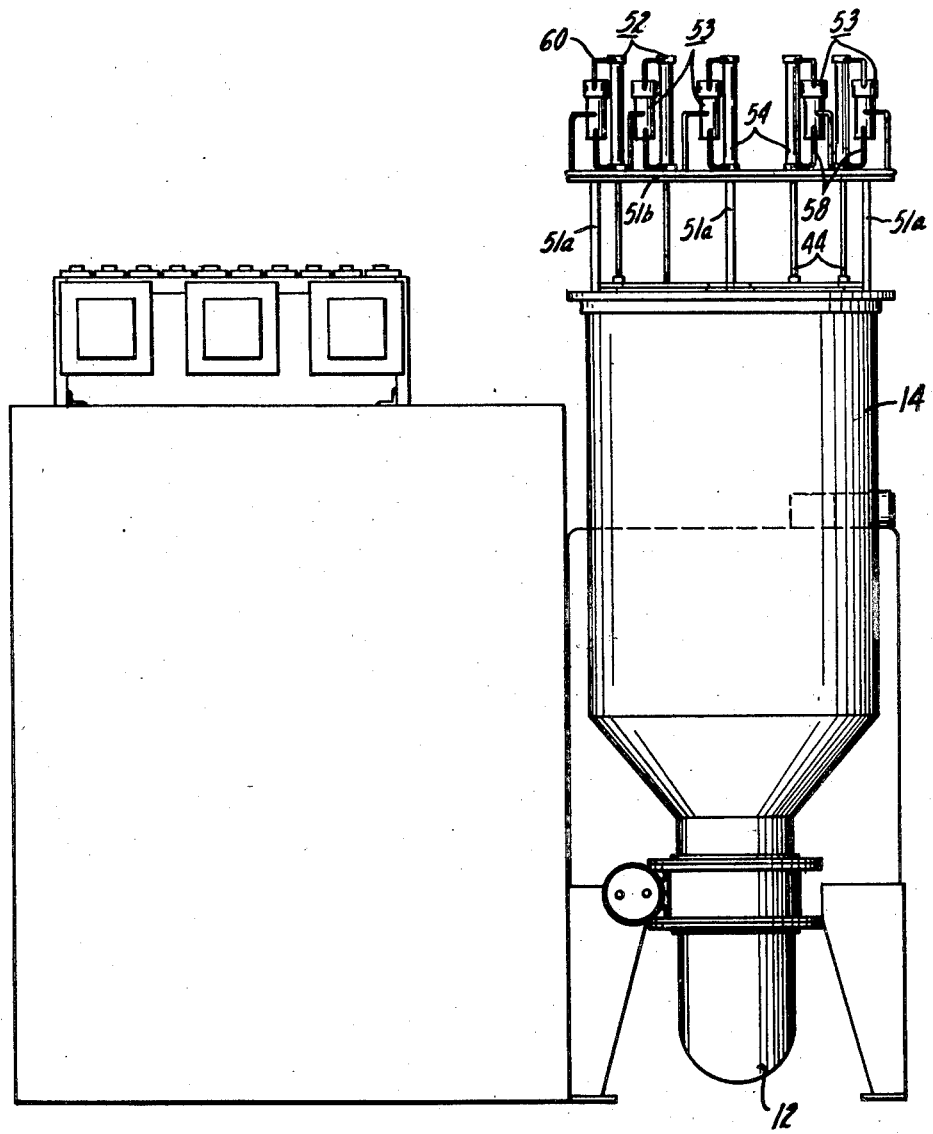
Figure 2 is a view of the rear of same.
Figure 3:
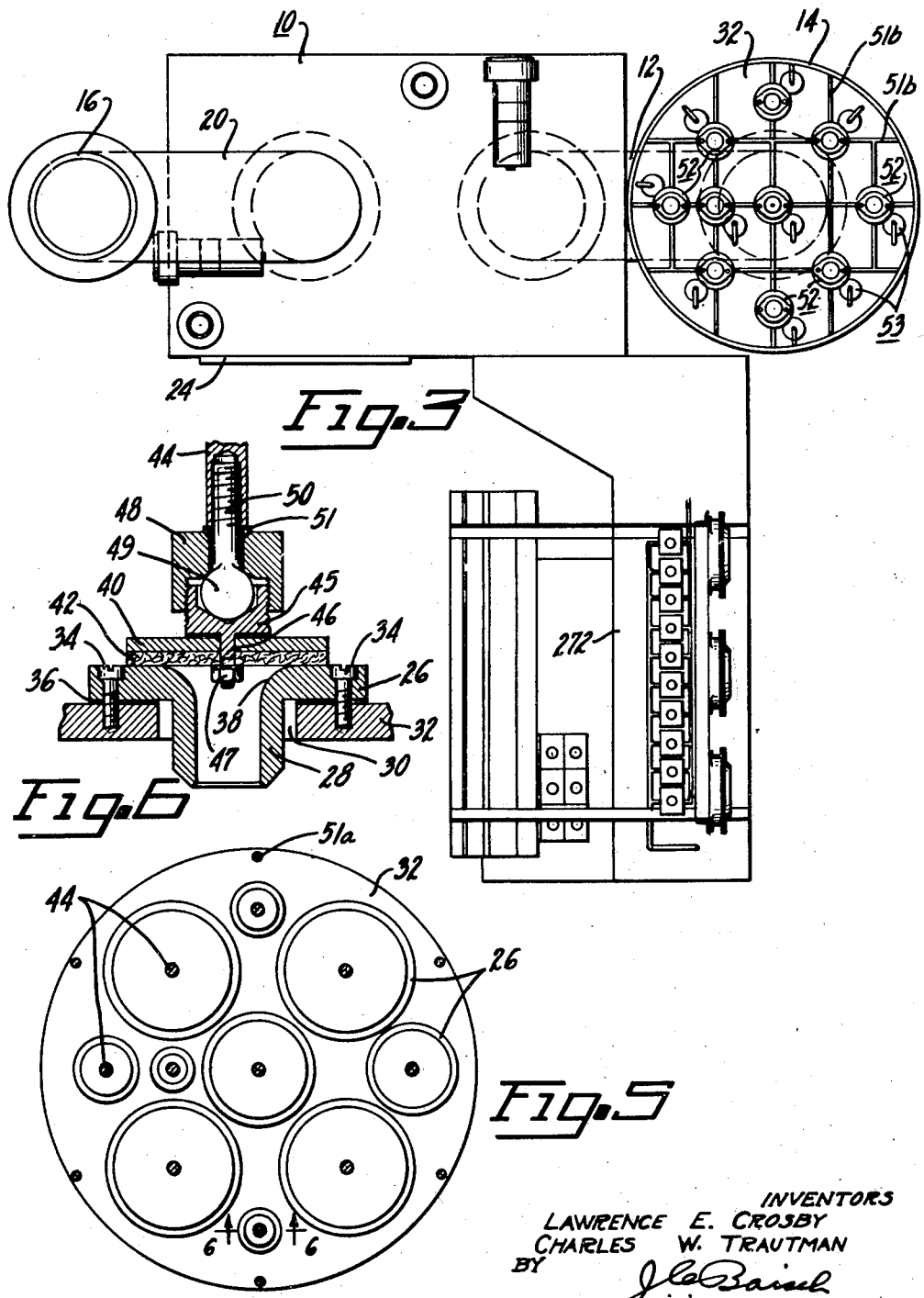
Figure 3 is a plan view of the same.

Referring more particularly to Figure 1, there is shown an air box 10 having an air inlet connection 12 with an air bottle 14. The air box 10 is provided with a manifold 16 through which air is withdrawn from said box 10 by any well known means such as a suction pump or the like, said manifold having a connection at 18 with the bottom of the air box, a branch 20 connected with the top of the box, and a branch 22 connected with one side of the box. These various connections provide convenient means for testing various types of carburetors such as the updraft type, the downdraft type, or the horizontal delivery type, as is well known in the art. A door 24 is provided for the box to permit access thereto.

Air enters the upper end of the bottle 14 through one or more valve controlled orifice insets, best shown in Figure 6. As the insets are all substantially alike except for size only one will be described. Each inset comprises a flange 26 from which a tubular portion 28 depends through an opening 30 in an orifice plate 32 which forms the upper end wall of the air bottle 14. Screws 34 secure the flange 26 to the plate 32 and a gasket 36, of any suitable material, is provided to prevent leakage of air between the parts. It is to be noted that the throat of the orifice is flared inwardly at 38 from the outer end of the inset similarly to a venturi. The movable valve members for the respective orifices are of similar construction, except for size, so that a description of only one of said valve members will be given herein. Each of said valve members comprises a valve plate 40 having a sealing gasket 42, which may be leather or other suitable material, secured thereto as hereinafter described, to insure effective sealing of the orifice opening by the valve member, it being understood that the upper face of the flange 26 serves as a valve seat for the movable valve member or closure and said seat and movable valve member are to be considered herein as the orifice valve. A ball and socket joint connects the valve plate and gasket 42 with a shaft 44, said joint comprising a recessed member 45 having a depending portion 46 of reduced diameter which extends through the plate 40 and gasket 42 and has a nut 47 threaded onto the free end thereof, said nut securing the member 45, plate 40 and gasket 42 together. The member 45 is externally threaded and is screwed into a member 48 and a ball 49 is received in the recess of member 45 and is provided with an integral stem 50 which is screwed into a bore in the adjacent end of the shaft 44, there being a packing 51, of felt or other suitable material, between the stem 50 and the member 48 to seal the joint against the entrance of dust or other foreign matter thereinto. A frame, comprising vertical members 51a and secured to the top of the bottle 14 and supporting horizontal cross members 51b, provides supporting means for the orifice valve members, pneumatic motors 52 which actuate said valves and pneumatic control valves 53 controlling the air to the motors 52, there being a motor and pneumatic control valve for each orifice valve. Each motor 52 comprises a cylinder 54, Figures 1 and 8, and a piston 56 slidable therein, said piston 56 being connected with the shaft 44 of the respective movable orifice member and said piston is adapted to be actuated by air pressure for opening and closing said orifice valve. Each motor 52 is connected with the respective valve 53 by air connections 58 and 60 which communicate with the lower and upper ends respectively of the cylinder 54 so that air under pressure may be admitted to either end of said cylinder according to the position of the control plunger of the valve 53, hereinafter described, such air under pressure being understood to mean herein air under such superatmospheric pressure as to be capable of actuating the various pneumatic devices of the present invention.

Figure 7:
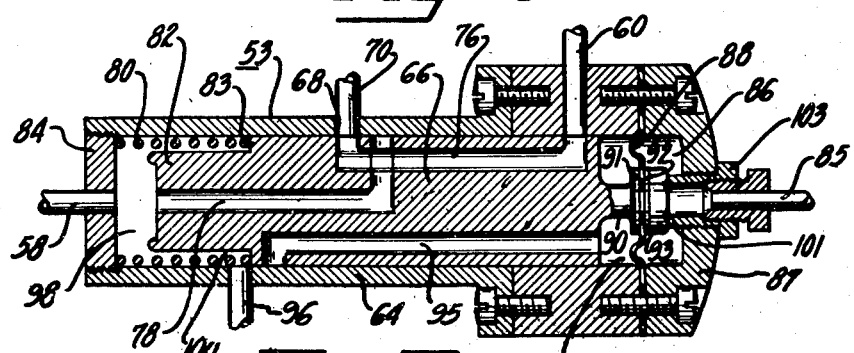
Figure 7 is an enlarged schematic longitudinal section of an air control valve in the pneumatic control system.

Each pneumatic valve 53, best shown in Figure 7, comprises a cylinder 64 having a control plunger 66 slidable therein. The cylinder has an inlet 68 adapted to be connected with a conduit or pipe 70 which in turn is connected, by means of a pipe 71, Figure 9, to a source of air under pressure shown herein at 72 as a pressure tank, said tank being supplied with air under pressure by a suitable air compressor of any well known type, not shown. However, the compressor may be directly connected with the valves 53 or any other suitable arrangement may be employed to provide air under pressure for the pneumatic system. The air inlet 68 of the valve 53 is located intermediate the ends of the cylinder 64 and is adapted to register, and communicate, with a passage 76, or a passage 78 respectively in the plunger 66 in accordance with the position of said plunger. The plunger is urged to the position shown in Figure 7 by a spring 80 which is disposed about a reduced diameter portion 82 of the plunger adjacent one end thereof and reacts between a shoulder 83 of the plunger and a wall member 84 screwed into the adjacent end of the cylinder 64, the plunger being limited in its movement to the right by the end 101 of a plug 103 screwed into the adjacent end wall or head 87 of the valve assembly. When the plunger 66 is in the position shown in Figure 7 opening 68 is in register with the adjacent left hand end of passage 76 whereby air under pressure entering the valve through said opening or port 68 is transmitted through passage 76 to the conduit 60, the right hand end of passage 76 then being in register with the adjacent end of the conduit 60 so that air under pressure is supplied to the upper end of the cylinder 64 to actuate the piston 56 in the downward direction for urging the orifice valve member against the seat or flange 26 and thereby closing the orifice. In order to effect upward movement of the piston 56 for opening of the orifice valve, air under pressure is admitted through a pipe 85, connected to a solenoid controlled valve hereinafter described, into a chamber 86 of the cylinder 64, the outer end of said chamber 86 comprising the rigid wall or head 87 and the inner wall of said chamber 86 being a flexible diaphragm 88 connected to a reduced diameter extension 90 of the plunger 66. The extension 90 is provided with a shoulder 91 from which a threaded end portion extends and is received in an opening in the diaphragm adjacent the center thereof. Reinforcing washers 92 are provided on each side of the diaphragm and said washers and diaphragm are clamped securely between the shoulder 91 and a nut 93 on said threaded portion. Air under pressure in the chamber 86 is adapted to urge the diaphragm 88 to the left, as viewed in Figure 7, and force the plunger 66 to the left until the reduced diameter portion 82 engages the wall 84 which limits said movement of the plunger. When the plunger is in its extreme position to the left the opening 68 is in registry with the transverse portion of passage 78. The air under pressure is then transmitted from passage 70 and port 68 through passage 78 and conduit 58 to the lower end of the cylinder 54 so that the piston 56 is moved upwardly. When the plunger 66 is in the last mentioned position and the piston 56 is moved upwardly, air in the upper part of the cylinder 54 must be exhausted to permit such upward movement of the piston 56 and said air is exhausted through the conduit 60 which is now in communication with a chamber 94 on the side of the diaphragm 88 opposite the chamber 86. From the chamber 94 the exhaust air is transmitted through an exhaust passage 95 which extends longitudinally from the right hand end of the plunger 66 to a lateral portion which is registered with the adjacent end of an exhaust conduit 96 to atmosphere communicating through the wall of the cylinder 64, it being noted that the left hand end of the plunger 66 then cuts off the left hand end of the cylinder from the conduit 96. When the plunger is in the position shown in Figure 7, for effecting downward movement of the piston 56 of the motor 52, air from the lower end of the cylinder 54 of said motor is exhausted through the conduit 58, chamber 98 at the left end of the valve cylinder 64, and passage 100 between the reduced end portion 82 and the inner wall of cylinder 64, said passage 100 then communicating with the exhaust conduit 96. With the plunger 66 in the position shown in Figure 7 the passage 95 is cut off from communication with conduit 96 and the chamber 94 is cut off from communication with the conduit 60.

Air under pressure to the chamber 86, transmitted by conduit 85, is controlled by a solenoid valve indicated generally at 150 and best shown in Figure 8. Said valve comprises a hollow casing member 152 with which conduit 85 is connected and a hollow valve casing 154 which is connected with the casing 152 adjacent one end and extends transversely thereof. Within the casing 154 are spaced partitions 156 and 158 which divide the casing 154 into chambers 160 and 162 and 164. The partitions 156 and 158 have respective valve openings 163 and 165 therethrough controlled by movable valve members or closures 166 and 168 respectively, said valve members 166 and 168 being connected by a valve stem 170 of such length that when one of the valves is closed the other of said valves is open. Air under pressure is supplied to the chamber 160 through a conduit 172 connected with tank 72 by a pipe 173 and pipe 71, and an exhaust pipe 174 to atmosphere is connected with the chamber 164. It is to be noted that, if desired, a pressure pump 290 may be interposed in the conduit 173. Valve members 166 and 168 are controlled by a solenoid 176 suitably mounted in a casing 177 attached to the casing 152. The solenoid is provided with a plunger 178 operably connected to the valve stem 170 by means of a lever 180 disposed within the casing 152 and chamber 162 and pivoted at 182. The valves 166 and 168 are yieldingly urged in opposite directions by springs 184 and 186 respectively and said springs are so calibrated that when the solenoid is deenergized the valve opening 165 is closed and the valve opening 163 is open.

When the solenoid is energized the valves 166 and 168 are moved downwardly, as viewed in Figure 8, so that valve opening 163 is closed and valve opening 165 is opened. Air under pressure, supplied through conduit 172, enters chamber 160 passes through the opening 165 in the partition 158, into chamber 162, thence into the casing 152 and to the chamber 86 of the valve 53 by way of pipe 85. Upon deenergization of the solenoid the valve opening 165 is closed and the valve opening 163 is opened whereupon the pressure in chamber 86 of valve 53 is relieved, the excess air in chamber 86 being exhausted to atmosphere through conduit 85, casing 152, chamber 162, opening 163 in the partition 156, chamber 164, and the exhaust conduit 174.

Figure 9:
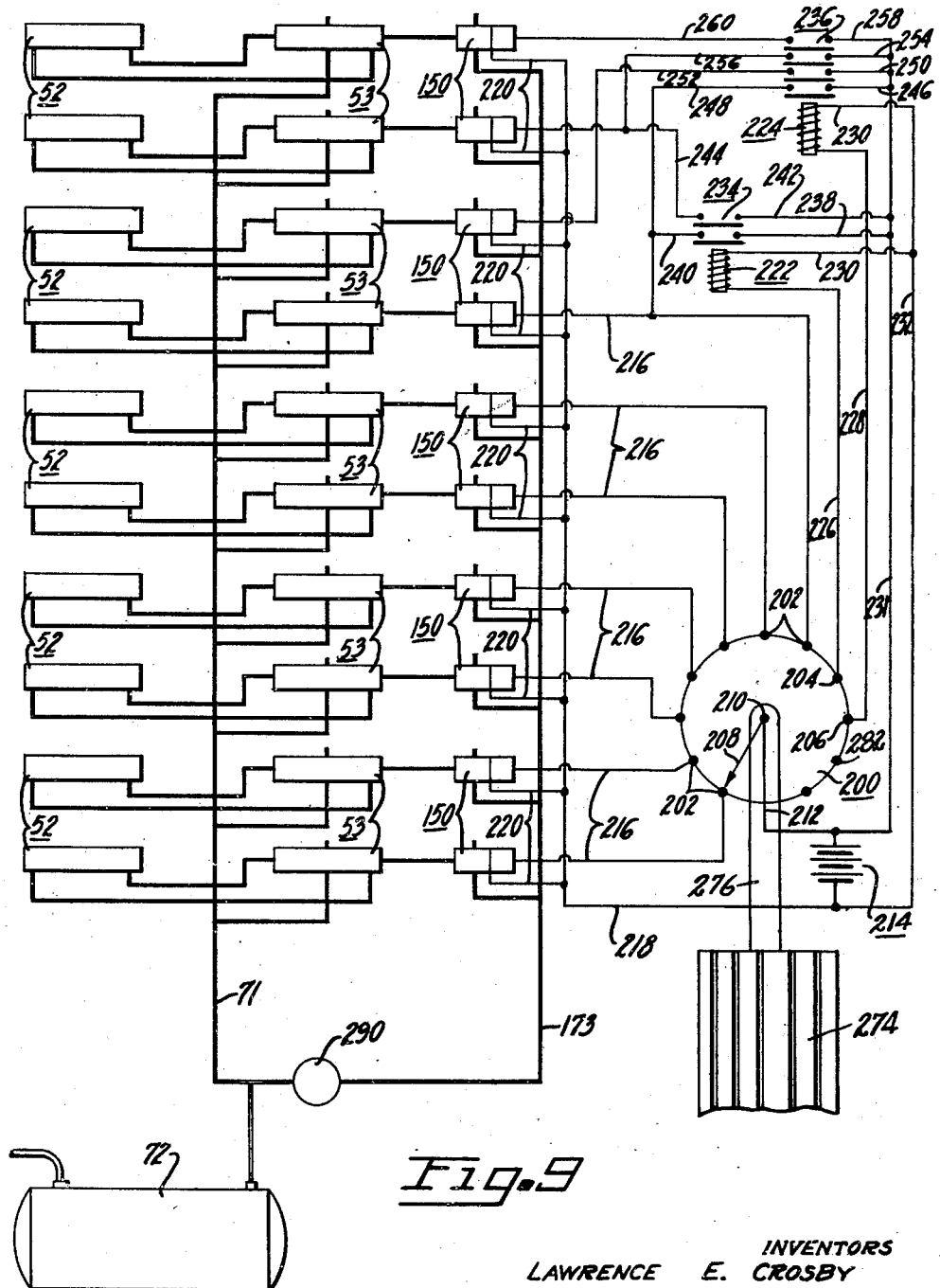
Figure 9 is a schematic view of the pneumatic and electrical systems.

The electrical system, best shown in Figure 9, comprises a switch, which is termed herein a distributor 200 and which has a plurality of contact points 202 and contact points 204 and 206 respectively, arranged in a circle and adapted to be contacted by the free end of a rotatable switch member or arm 208, centrally pivoted, at 210, with respect to the foregoing contacts. The arm 208 is connected by a wire 212 with a source of electrical power which, as shown, is a battery, indicated generally at 214, although any other suitable source of electric power may be used. Certain of the solenoid operated valves 53 are connected by respective wires 216 with respective contacts 202 and are also connected to the battery 214 by a wire 218 and respective branch wires 220. Contact with any one of the contacts 202 by the contact member 208 will effect energization of the respective solenoid with which said contact is connected, which in turn will effect actuation of the valves 166 and 168 of the respective solenoid valves 150 controlling a respective valve 53 which in turn controls the actuation of the respective motor 52 and orifice valve with which said motor is connected.

If desired, in order to have a greater range of effective orifice openings, a plurality of orifices (two or more) may be opened for a test, a desirable arrangement of this character being shown in Figure 9 wherein the contacts 204 and 206 are connected with relays 222 and 224 by wires 226 and 228 respectively, each relay having a connection 230 with a return wire 232 connected with the battery 214 for completion of the relay circuits. The relays 222 and 224 are adapted to control respective switches 234 and 236. The switch 234 controls the flow of current through wires 238—240 and 242—244, the wires 238 and 242 being connected to a wire 231 to the battery and the wires 240 and 244 are respectively connected with the solenoid of a valve 150 so that when switch 234 is closed the solenoids of a plurality of said valves 150 are energized, there being two valves thus energized in the arrangement shown in the drawing. Switch 236 controls the flow of current through wires 246—248, 250—252, 254—256 and 258—260. The wires 246, 250, 254, and 258 are connected with the wire 231 and wires 248, 252, 256 and 260 are respectively connected with the solenoid of a valve 150 so that when switch 236 is closed by relay 224 the solenoids of four valves 150 are energized for effecting opening of four orifices. Other numbers of valves may be thus controlled if desired as well as other combinations of valves and more relay switches may be incorporated in the system. It is to be noted that the solenoids of the upper three valves 150, as viewed in Figure 9, also have connections 220 with wire 218 for completion of their respective circuits and it is to be understood that solenoid valves 150 controlled by the switches 234 and 236 may include valves connected with some of the contacts 202 or they may be other valves not otherwise connected into the electrical system. Moreover there may be other combinations of valves controlled by the relays which combinations may be various and numerous. A plurality of vertical contacts 282 are shown although one is generally sufficient. If desired the surplus points may be used to provide still other orifice controls.

Figure 4:
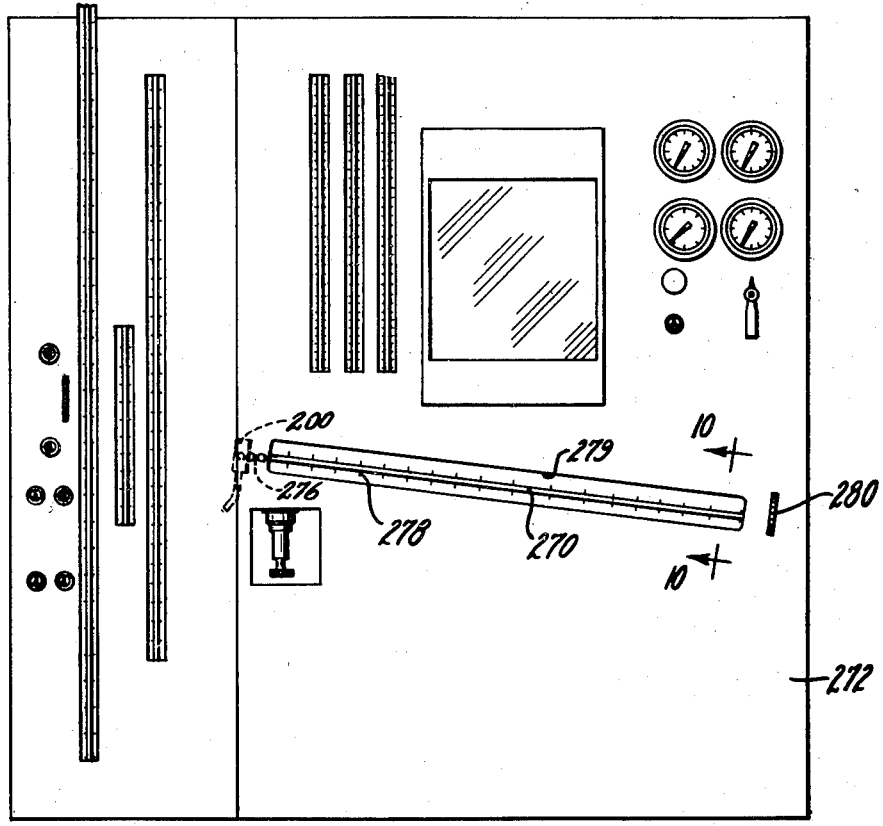
Figure 4 is a front view of the flow box control panel.

Means for indicating the flow of air through or the pressure differential across the various orifices or combinations of orifices, comprises a gage which as shown is preferably an inclined manometer tube 270, Figures 4 and 10, of known type having the usual connections which are well known in the art, said tube 270 being attached to panel 272. Mounted behind the panel and tube 270 is a drum 274 which is rotatable on a shaft 276, Figure 10, mounted in a frame 277 attached to the back of panel 272. A plurality of graduated scales 278 are secured to the drum 274 and are adapted to be used in conjunction with the manometer tube 270, each scale being calibrated to measure the air flow through the respective orifices or combinations thereof, or the pressure differential thereacross, it being understood that there is a scale on the drum calibrated for each orifice and/or for each combination of orifices. The drum is so positioned with respect to a slot 279 in the panel 272 that respective scales may be brought into registry with the slot in closely adjacent relationship with said tube. Each scale is preferably limited to the recommended usable range for each orifice, and the orifice sizes are so selected that a slight overlap in the recommended range of values or rates of flow is provided for succeeding orifices.

In order to correlate the proper scales with the respective orifices or group of orifices for which they are calibrated the scale supporting drum 274, on which the various scales are mounted, is connected with the arm 208 of the distributor 200 by shaft 276, the scale supporting drum 274 and the distributor being so constructed and arranged that there is a contact for each scale and when any particular scale is brought into position adjacent a manometer tube 270 and registration with slot 279 the arm 208 of the distributor will contact one of the contacts 202, 204 or 206.

When the conditions of flow of fluid to the device to be tested changes whereby the orifice then being used is no longer efficient for accurate measurement of the flow, the operator can change to another size orifice which will give accuracy and efficiency. To effect such a change the operator rotates the drum by means of a knurled wheel 280 secured to the shaft 276 and which is received in a slot therefor in the panel 272, the rim of said wheel 280 extending through said slot and projecting outwardly of the front face of the panel.

*Operation*

Assuming that all the orifices are closed and that the first scale (the scale for the smallest orifice) is moved into position relative to the manometer tube 270, the arm 208 contacts the contact 202 for the bottom valve 150 as shown in Figure 9. The solenoid of the lower solenoid valve 150 is then energized whereupon the valve members 168 and 166 thereof are moved downwardly so that the opening 165 is opened and the opening 163 is closed by valve 166. Air under pressure then is transmitted through the valve 150 and conduit 85 to the chamber 86 of the valve 53. The pressure of the air in chamber 86 acts on the diaphragm 88 and effects movement to the left, as shown in Figure 7, of plunger 66. Compressed air from conduit 68 is transmitted to conduit 58, as hereinabove described, to the lower end of cylinder 54 of the respective motor 52 thereby causing the piston 56 thereof to move upwardly in the cylinder and raise the respective orifice valve member 40 from the flange 26 of the orifice, thus opening the orifice to permit air to enter the bottle 14 therethrough. Should the drum 274 be rotated to bring the next scale into position for use, the arm 208 will be moved to the next contact 202 of the distributor for opening the next larger orifice as above described, whereupon the lower solenoid operated valve 150 will be deenergized causing the valves 166 and 168 to return to their normal position which is shown in Figure 8. The pressure in chamber 86 of the lower valve 53 will then drop to atmospheric pressure and spring 80 thereof will move the plunger to its normal position as shown in Figure 7. Air under pressure will then be transmitted from conduit 68 to conduit 60, of the lower valve 53, which leads to the upper end of the lower cylinder 54 whereupon the piston 56 thereof will be forced downwardly to bring the respective valve 40 into contact with the flange 26 thereby closing the orifice. As the scales are successively brought into position relative to the manometer tube 270 the arm 208 contacts the respective contact points 202 thereby closing the respective circuits to the solenoids of other valves individually or to the contacts 204 or 206 for the respective relays to effect opening of a plurality of orifices simultaneously.

From the foregoing it will be understood that with the present arrangement a particular orifice is opened in accordance with the positioning adjacent the manometer tube of the scale calibrated for that particular orifice and when the respective scale, calibrated for a certain air flow permitted by the opening of a plurality of orifices, is brought into position relative to the manometer tube 270 the proper orifices are automatically opened. Thus it will be seen that the possibility of error in making tests with the present invention is nullified or entirely eliminated.

It is thought that the invention and many of its attendant advantages will be understood from the foregoing description and though said invention has been illustrated in connection with but one modification thereof it will be apparent that various changes may be made in the form, construction, and arrangement of the parts without departing from the spirit and scope of the invention or sacrificing all of its material advantages, the form hereinabove described being merely a preferred embodiment.

We claim:

1. In a device for measuring fluid flow: a conduit through which air is adapted to flow; a plurality of orifices through which the air is adapted to flow into the conduit, said orifices being of different sizes; valves controlling said orifices; means for indicating the flow of air through said orifices; a scale for each orifice calibrated for measuring the rate of flow therethrough; means adapted to bring the scale corresponding to the orifice in use into reading position adjacent the first mentioned means; means for opening the valves of the respective orifices; and means for synchronizing the movement of the scales into position adjacent the indicator and the opening of the respective orifices.

2. The invention defined by claim 1 wherein the valves controlling the orifices are actuated by pneumatic means.

3. The invention defined by claim 1 wherein the scale positioning mechanism controls electrical means for selecting the orifice valve to be opened.

4. The invention defined by claim 1 wherein there is an electrical system controlling the valve opening means and including a distributor; and means connecting the scale mechanism and distributor whereby positioning a scale will automatically effect opening of the orifice for which said scale is calibrated.

5. The invention defined by claim 1 including means for automatically effecting opening the valves of a plurality of orifices; and wherein there is a scale graduated to measure the air flow through said plurality of orifices.

6. In a device for measuring fluid flow: a conduit through which air is adapted to flow; a plurality of orifices through which the flowing air is adapted to pass into the conduit, said orifices being of various sizes; a valve for each orifice; a pneumatic system including a pneumatic motor for each valve for moving same to open position and for closing same; pneumatic valve means adapted to control the respective motors; means for indicating the flow of air through the orifices; a graduated scale for each orifice and calibrated according to the size thereof, said scales being adapted to be selectively positioned adjacent the indicating means; and automatic means so constructed and arranged that when a scale is brought into position adjacent the indicating means the valve of the orifice for which the scale is calibrated is automatically opened, all other valves being closed.

7. In a device for measuring fluid flow: a passage through which air is adapted to flow; a plurality of orifices of various sizes communicating with said passage and through which the flowing air is adapted to pass; a valve controlling each orifice; means for indicating the flow of air through the orifices; a scale for each orifice calibrated to measure the flow therethrough and adapted to be selectively positioned adjacent the indicating means; means for opening and closing the respective valves of the orifices; and electrical control means synchronized with the positioning movement of said scales, said electrical means being so constructed and arranged that the positioning of a scale adjacent the indicating means will automatically effect opening of the orifice for which said scale is calibrated.

8. In a device for measuring fluid flow: an air passage through which air is adapted to flow; a plurality of orifices of various sizes in the passage air stream; a valve for each orifice; pneumatic means for controlling the respective valves; means for indicating the flow of air through the orifices; a scale for each orifice adapted to measure the flow of air through said orifice; means for positioning the respective scales adjacent the flow indicating means; and electrical means controlled by the scale positioning means and so constructed and arranged as to control the pneumatic means for opening the valve of the orifice for which the scale is calibrated.

9. The invention defined by claim 8 wherein the electrical means includes means for opening the valves of a plurality of orifices, and said scale is calibrated to measure the flow of air through said plurality of orifices.

10. The invention defined by claim 8 wherein the pneumatic system includes a pneumatic motor for each orifice valve so constructed and arranged as to open and close said valve; and a control valve for each motor adapted to control the flow of air thereto whereby the motor respectively opens and closes said orifice valve.

11. The invention defined by claim 8 wherein the electrical system includes a distributor actuated by the scale positioning means; and electrically actuated means for each pneumatic valve adapted to control same.

12. The invention defined by claim 8 wherein the pneumatic means includes a pneumatic motor for each orifice valve which is adapted to open and close said valve; a pneumatic control valve for each motor adapted to control the flow of air thereto; a second pneumatic valve adapted to control the first mentioned pneumatic control valve; a distributor for the electrical system, said distributor being controlled by the scale positioning means and includes a plurality of contact points; and a solenoid for each of the second mentioned pneumatic valves for controlling the same, the solenoids being connected to respective contacts of the distributor.

13. In a device for measuring fluid flow: an air passage through which air is adapted to flow; a plurality of orifices in the path of the air flow; an orifice valve for each orifice; pneumatic motors for respective orifice valves; pneumatic control valves for controlling the flow of air to respective motors whereby respective orifice valves may be opened and closed; second pneumatic control valves for respective first mentioned pneumatic control valves and adapted to control said first mentioned pneumatic valves; solenoids for respective second mentioned pneumatic valves for controlling same; a distributor having a contact point for each of the solenoids and connected therewith; a distributing arm for the distributor adapted to contact the respective contact points; means for indicating the flow of air through the orifices; a scale for each of the orifices calibrated to register the air flow therethrough; means for positioning the respective scales adjacent the indicating means; and means connecting the scale positioning means and distributor arm whereby said arm is adapted to contact respective contact points and energize a solenoid for effecting opening of the valve of the orifice for which the scale is calibrated, when such a scale is positioned adjacent the air flow indicating means.

14. The invention defined by claim 13 including a relay connected to a contact point of the distributor; a switch actuated by said relay; electrical circuits controlled by said switch whereby a plurality of solenoids are energized for effecting the opening of a plurality of orifice valves, there being a scale calibrated to indicate the air flow through the opened orifices.

15. In a device for measuring fluid flow: a conduit through which fluid is adapted to flow; a plurality of orifices of different sizes communicating with said conduit and through which fluid is adapted to flow; means for measuring the fluid flow including an indicator and a calibrated scale for each orifice; means adapted to bring the scale corresponding to the orifice in use into reading position with the indicator; means for rendering the respective orifices operative; and means for synchronizing the positioning of the respective scales into reading position with the indicator and rendering operative the respective orifices for which said scales are calibrated.

16. In a device for measuring the characteristics of a charge forming device for internal combustion engines or the like: an air passage through which air is adapted to flow; a plurality of orifices in the passage air stream; a valve for each orifice; means for controlling the respective valves; means for indicating the flow of air through the orifices; a scale adapted to measure the flow of air through one of said orifices; a scale adapted to measure the flow of air through a plurality of said orifices; means for positioning the respective scales adjacent the flow indicating means; and means controlled by the scale positioning means, so constructed and arranged as to control the valve opening means and synchronize the opening of the valves of the orifices with the positioning of the respective scales for which said orifices are calibrated.

17. In a device for measuring the characteristics of a charge forming device for internal combustion engines or the like: an air passage; a plurality of orifices of various sizes connected with said passage; a valve for each orifice; means for controlling the respective valves; means for indicating the flow of air through the orifices; a plurality of scales adapted to measure the flow of air through various combinations of orifices respectively, means for positioning the respective scales adjacent the flow indicating means; and means controlled by the scale positioning means and so constructed and arranged as to control the opening of the valves of the respective combinations of orifices in accordance with the positioning of the respective scales for which said

L. E. CROSBY.
CHARLES W. TRAUTMAN.

Certificate of Correction

Patent No. 2,414,582.  January 21, 1947.

LAWRENCE E. CROSBY ET AL.

It is hereby certified that errors appear in the printed specification of the above numbered patent requiring correction as follows: Column 4, line 39, after "orifice" insert *valve*; column 12, line 38, claim 17, after "said" insert the words and period *combinations are calibrated.*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.*